United States Patent [19]

Cooper et al.

[11] 3,949,256

[45] Apr. 6, 1976

[54] SUPPORT ARRANGEMENT FOR TURBINE GENERATOR STATOR COILS

[75] Inventors: Glenn D. Cooper, North Huntingdon; Franklin J. Murphy, Jr., Delmont, both of Pa.

[73] Assignee: Westinghouse Electric Corporation, Pittsburgh, Pa.

[22] Filed: Jan. 24, 1975

[21] Appl. No.: 543,738

[52] U.S. Cl. .............................. 310/260; 310/254
[51] Int. Cl.² .......................................... H02K 3/46
[58] Field of Search .......... 310/260, 270, 271, 272, 310/254, 216, 217, 45, 64, 194, 55, 59, 256, 213, 179, 262; 336/197

[56] References Cited
UNITED STATES PATENTS

| | | | |
|---|---|---|---|
| 1,007,506 | 8/1911 | Tingley | 310/260 |
| 2,437,990 | 3/1948 | Askey | 310/260 |
| 2,780,739 | 2/1957 | Baudry | 310/55 |
| 2,917,644 | 12/1956 | Laffoon | 310/55 |
| 2,994,735 | 8/1961 | Marshall | 310/260 |
| 3,330,978 | 7/1967 | Pettit | 310/260 |
| 3,365,600 | 1/1968 | Penn | 310/260 |
| 3,648,091 | 3/1972 | Kostin | 310/260 |
| 3,731,127 | 5/1973 | Harrington | 310/254 |

FOREIGN PATENTS OR APPLICATIONS

| | | | |
|---|---|---|---|
| 1,110,481 | 4/1968 | United Kingdom | 310/260 |
| 505,585 | 9/1952 | Belgium | 310/260 |

*Primary Examiner*—R. Skudy
*Attorney, Agent, or Firm*—J. R. Hanway

[57] ABSTRACT

Wedge-shaped insulating blocks are located between conductors at the end of the stator winding coils. The blocks tangentially separate adjacent conductors at a plurality of positions around the periphery of the stator winding structure. A band is positioned around several of the conductors and blocks to force the structure together. Cross-bands are positioned around the blocks and the band which surrounds the group of conductors to tighten the surrounding band. Wedges may be positioned between all of the banded groups to secure the entire stator winding assembly.

10 Claims, 4 Drawing Figures

SUPPORT ARRANGEMENT FOR TURBINE GENERATOR STATOR COILS

BACKGROUND OF THE INVENTION

1. Field of the Invention

This invention relates, in general, to electromechanical devices and, more specifically, to supporting arrangements for stator coil conductors.

2. Description of the Prior Art

The stator winding of a turbine generator includes coils which consist of top and bottom conductors that extend through slots in the stator iron core and project into the end regions of the generator. After leaving the stator iron core, the top and bottom conductors cross each other at an angle for the purpose of allowing the conductor ends to obtain a different tangential position for interconnection between the top and bottom conductors. Such a connection is generally known as a series connection and interconnects the strands of top and bottom conductors at the axially outermost position of the stator winding structure. At this interconnection position or region, the top and bottom conductors are formed to extend axially parallel to each other to facilitate interconnection between the strands of the conductors.

Since this interconnecting region is located at the outermost portion of the stator winding, considerable vibration and deformation of the copper strands of the conductors is caused by the electromagnetic effects of the current in the conductors. This is undesirable since excessive movement in this region may separate the copper strands of the conductors from the cooling vent tubes which may be interposed with the copper strands, cause fatigue failure of the strands, and cause abrasion of the copper strands due to loose insulating separators between transposition groups of the series connection. Therefore, it is important for proper turbine generator construction to provide adequate supporting means for the conductors of the stator winding in the region where the series connections between the conductors exist.

According to one prior art arrangement, insulating blocks are placed between all of the series connections around the stator winding and secured individually to each pair of conductors connected together by the series connection. Other insulating blocks are positioned between a group of interconnections which form a phase group within the stator winding structure. Similarly, the phase group separating blocks are connected directly to the adjacent conductor and series connections. Such an arrangement is useful in reducing the vibration and deformation of the components located in the region of the series connections of the stator winding, but the type of construction provided thereby cannot easily produce a winding supporting structure which tightly holds the separating blocks between the series connections throughout the life of the machine. Therefore, it is desirable, and it is an object of this invention, to provide an arrangement for securing the stator winding structure, in the region of the series connections, in such a manner that vibrational movement in this region is minimized throughout the life of the machine.

SUMMARY OF THE INVENTION

There are disclosed herein new and useful arrangements for securing and bracing the series connections in turbine generator stator windings. Wedge-shaped blocks are positioned between all of the series connections contained within each phase group of the stator winding. A band is wrapped around the series connections, and the blocks therebetween, which form the entire phase group. This band provides a compressive loading between the series connections and the blocks to prevent individual vibration of the series connections. Cross-banding is applied around this band and around the blocks between the series connections to increase the compressive loading provided by the band around the phase group. The other phase groups of the stator winding are constructed in a similar manner and suitable wedge blocks may be positioned between each phase group to provide compressive loading around the entire periphery of the stator winding structure.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
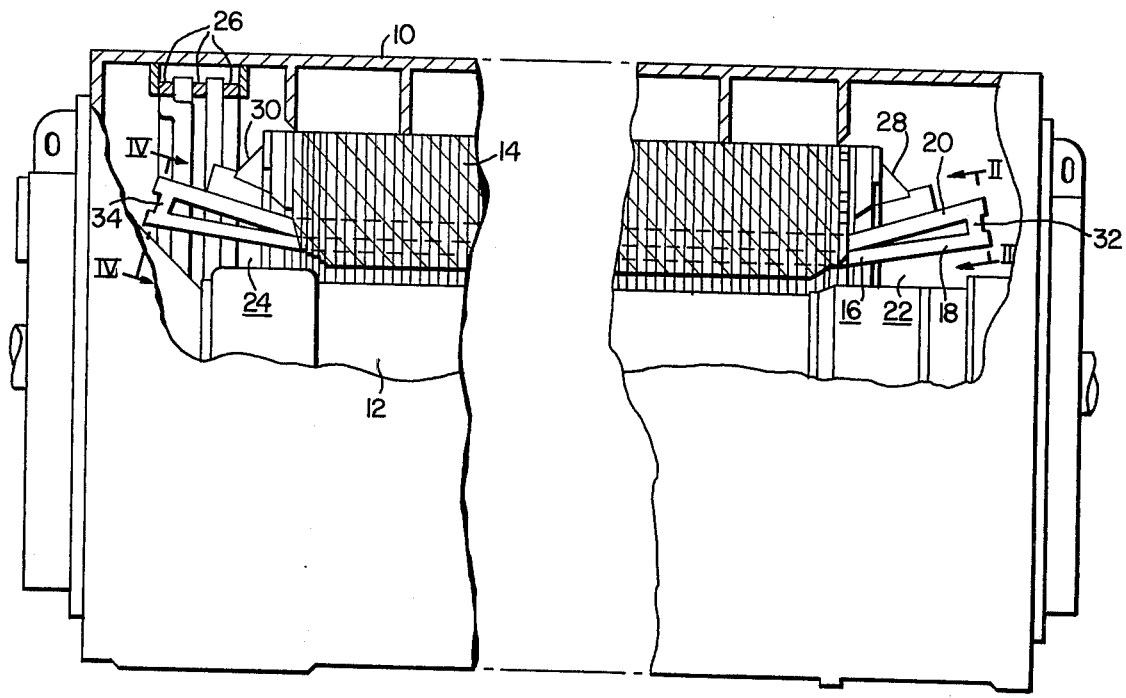
FIG. 1 is a cut-away view of a turbine generator illustrating where the supporting arrangements constructed according to this invention are positioned.

Throughout the following description, similar reference characters refer to similar elements or members in all of the figures of the drawing.

Referring now to the drawing, and to FIG. 1 in particular, there is shown a turbine generator of the type in which the present invention may be used. The generator includes the enclosure 10, the rotor 12, the stator magnetic structure 14, and the stator winding structure 16. The stator winding structure 16 includes a plurality of top and bottom conductors, such as the top conductor 18 and the bottom conductor 20. These conductors extend through slots in the stator magnetic structure 14 and project into the end regions 22 and 24 of the generator 10. The end region 22 is generally referred to as the turbine end of the generator, and the end region 24 is generally referred to as the exciter end of the generator. The exciter end 24 of the generator includes the phase rings 26 which extend around the generator enclosure 10 and are connected to various conductors of the stator winding structure 16.

The top and bottom conductors 18 and 20, which are only two of the many which would normally be used in a generator constructed according to FIG. 1, are secured to the stator winding support assemblies 28 and 30. Normally, the conductors that are secured to the support assemblies 28 and 30 cross each other at an angle which is not susceptible from the view of the generator shown in FIG. 1. However, these conductors cross each other, as those skilled in the art are aware, in order to align the proper end of the conductors with each other for ease in making the series connections between the appropriate conductors.

At the turbine end 22 of the generator, the series connections, such as the series connection 32, interconnect the appropriate top and bottom conductors. It is at this position that one of the supporting arrangements of the invention is located. Similarly, at the exciter end 24 of the generator, the series connections, such as the series connection 34, connect together appropriate top and bottom conductors. Another of the supporting arrangements of this invention is used at this location.

Figures 2, 3, 4:
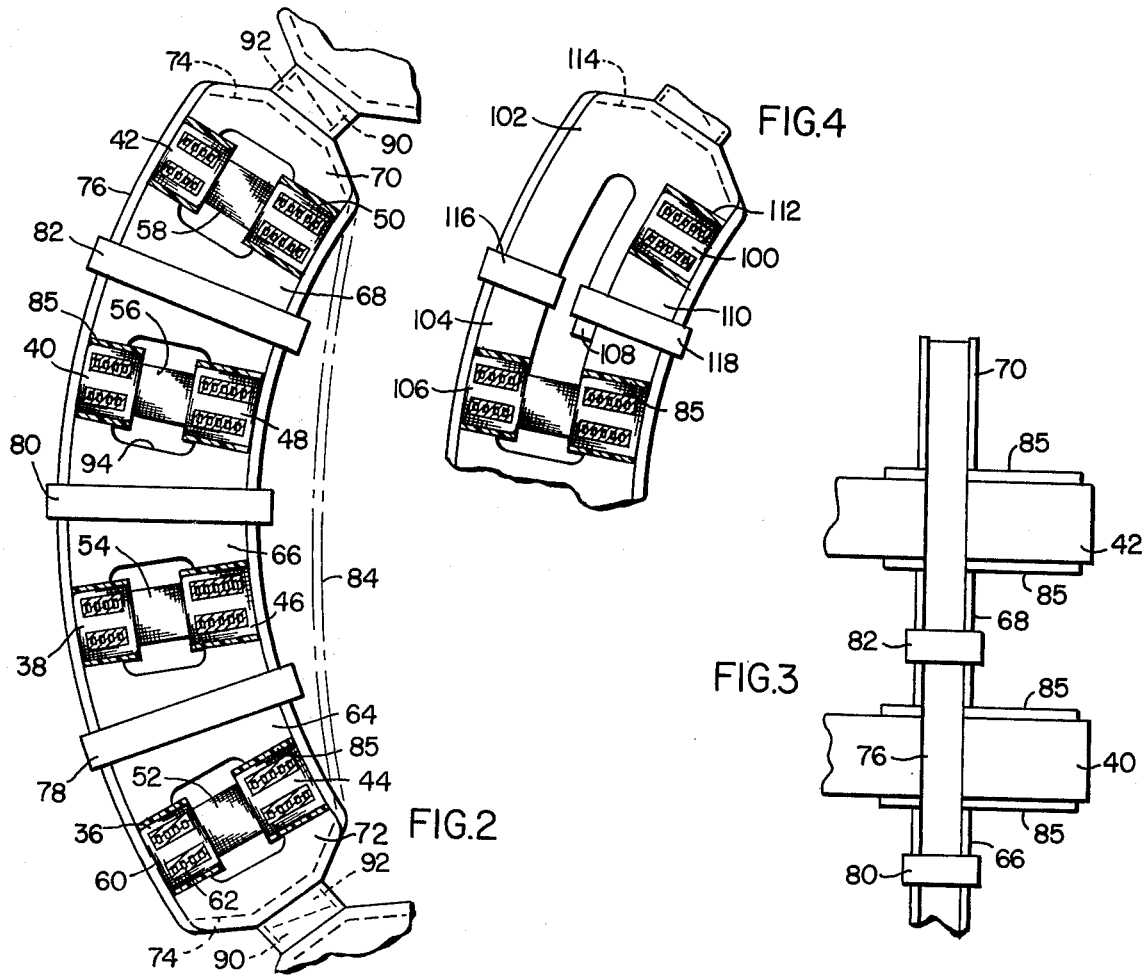
FIG. 2 is a cross-sectional view taken generally along the line II—II of FIG. 1, illustrating a supporting arrangement constructed according to one embodiment of this invention.
FIG. 3 is a top view of the supporting arrangement shown in FIG. 2.
FIG. 4 is a cross-sectional view taken generally along the line IV—IV of FIG. 1, illustrating a supporting arrangement constructed according to another embodiment of this invention.

FIG. 2 is a cross-sectional view, taken generally along the line II—II shown in FIG. 1, illustrating one embodiment of the supporting arrangement of this invention. In FIG. 2, the bottom conductors 36, 38, 40 and 42 are connected to the top conductors 44, 46, 48 and 50 by the series connections 52, 54, 56 and 58, respectively. The top and bottom conductors in this embodiment consist of a plurality of copper strands, such as the strand 60 in the conductor 36, and a plurality of vent tubes, such as the vent tube 62 in the bottom conductor 36. The vent tubes extend through the conductors from one end of the generator to the other end and allow for cooling gas to flow through the conductors for the removal of heat therefrom. The series connections between the top and bottom conductors normally connect the strands of the conductors to each other and are normally not connected to the vent tubes.

The group of conductors shown in FIG. 2 comprise all of the conductors which form a phase group within the stator winding structure. Although the invention may be used to combine more or less series connections than those which constitute a complete phase group, the arrangement shown in FIG. 2 is illustrated as a preferred embodiment of the invention.

Each of the series connections is separated from the other connections by series spacing blocks, such as the blocks 64, 66 and 68. These blocks are constructed of a suitable insulating material, such as a glass epoxy laminated material. The blocks 64, 66 and 68 are wedge-shaped to satisfactorily fit between the series connections and their associated conductors. The dimensions of the spacing blocks 64, 66 and 68 are sufficient to provide blocks which are mechanically able to withstand the forces encountered when used in this manner. The group of conductors shown in FIG. 2 are also bounded on each side thereof by the phase spacing blocks 70 and 72 which may be constructed of a material similar to that used for the series spacing blocks. The phase spacing blocks 70 and 72 contain channels 74 into which the strap or band 76 is positioned. The band 76 is constructed of a suitable non-stretchable material, such as resin impregnated or coated glass filament tape.

The purpose of the band 76 is to provide a compressive loading between the various spacing blocks and the series connections. By providing such a force structure, the series connections are tightly held together with respect to each other and the chance of loosening of the structure during the life of the generator is substantially enhanced over the prior art techniques. The cross-bands 78, 80 and 82 are disposed around the series spacing blocks and the band 76 to provide a convenient means for establishing a suitable amount of compressive force within the structure. The cross-bands are positioned around the band 76 when it is located substantially in the position 84. As the cross-bands are tightened, the band 76 is pulled against the top conductors and the series spacing blocks. This increases the tension in the band 76 and increases the compressive loading within the phase group of conductors and series connections.

Suitable rigid insulating members 85 are positioned between the spacing blocks and the conductors to provide adequate surface area for contact between the conductors and the spacing blocks. This prevents direct contact between the strands of the conductors and the spacing blocks. Although not shown in FIG. 2, conformable spacers constructed of a suitable material, such as resin impregnated Dacron felt, may be positioned between various surfaces of the supporting arrangement to facilitate fitting of the members and bonding together of the structural elements.

Several phase groups would normally exist in the stator winding structure 16. Each phase group may be supported by the arrangement shown in FIG. 2, with all of the phase groups placed under a compressive loading by placing spacing elements between the various phase groups, Such a spacing element is illustrated in this specific embodiment as the wedges 90 and 92 which may be moved relative to each other to apply the proper amount of force to the phase groups. The wedges 90 and 92 are shown wrapped with a cured epoxy coated glass banding to maintain the position of the wedges. By using the supporting arrangement shown in FIG. 2, a compressive loading around the entire periphery of the stator winding structure, in the vicinity of the series connections between the conductors of the stator coils, is provided. The conductors and series connections are unable to move relative to each other and the type of construction taught by this invention inherently maintains its force over a long period of time. Thus, the conductors and series connections are unlikely to become loose and vibrate due to the electromagnetic forces established by the current flowing through the conductors.

The indentations or channels 94 in the series spacing blocks 64, 66 and 68 and the phase spacing blocks 70 and 72 provide for better alignment of the spacing blocks with the surfaces of the conductors. Without the indentations or channels 94, a slight displacement of the top conductors from the same tangential position as the bottom conductors would prevent the sides of the spacing blocks to flatly rest against both conductors. However, due to the channels 94, this tendency is greatly reduced.

FIG. 3 is a top view illustrating generally the position of the band 76 and the spacing blocks relative to the series connections. As shown in FIG. 3, the rigid reinforcing members or plates 85 contact more of the surface of the conductors 40 and 42 than would the blocks 66, 68 and 70 if they were located directly adjacent to the conductors 40 and 42. Thus the rigid reinforcing plates 85 effectively provide a greater surface area on which the force is concentrated. As mentioned hereinbefore, both the top and bottom conductors and the adjacent conductors extend substantially parallel to each other in this region of the stator winding structure 16. The spacing blocks and the band 76 are applied to the conductors at the axial position indicated to adequately maintain the interface between the conductor strands and the vent tubes. The conductor strands leave the plane of the conductor at a right angle whereas the vent tubes extend further in an axial direction.

FIG. 4 is an end view of the stator winding structure 16 taken generally along the line IV—IV of FIG. 1. FIG. 4 illustrates, in a partial view, an embodiment of this invention when used at the exciter end 24 of the generator. The last conductor of each phase winding group is not aligned tangentially with another conductor at the exciter end of the generator. For example, the conductor 100 as shown in FIG. 4 does not have a corresponding bottom conductor located radially outward from the conductor 100. The phase block 102 is constructed in such a manner as to properly terminate a phase group which has a single conductor at the end thereof without a series connection to another conductor.

The phase block 102 includes a projection 104 which extends to the conductor 106. The phase block 102 also includes the projection 108 and the filler block 110. A notch or channel 112 in the phase block 102 permits placement of the phase block 102 around the conductor 100. The band 114 is tied to the phase block 102 by the strap 116 and by the strap 118 which also holds the filler block 110 in place. A similar type of construction would normally be used at the other end of the phase group except that the phase block assembly would be inverted to correspond to the single conductor being a bottom conductor rather than a top conductor as shown in FIG. 4.

Since numerous changes may be made in the abovedescribed apparatus, and since different embodiments of the invention may be made without departing from the spirit thereof, it is intended that all of the matter contained in the foregoing description, or shown in the accompanying drawing, shall be interpreted as illustrative rather than limiting.

We claim as our invention:

1. An electromechanical device comprising:
    a rotor;
    a stator magnetic structure;
    stator coils which extend from slots in the stator magnetic structure, said coils including a top conductor and a bottom conductor which are electrically connected together at the ends of the coils by stator coil connections which extend radially between the top and bottom conductors at the connecting region of the stator coils;
    separating blocks which are constructed of an insulating material and which are located tangentially between connecting regions to separate adjacent stator coil connections;
    a band disposed around a group of coil connections for providing a tangential force which firmly holds the connections and blocks together; and
    cross-bands disposed around at least some of the separating blocks and around the band which is disposed around the group of coil connections.

2. The electromechanical device of claim 1 wherein a relatively rigid material is positioned between the conductors and the adjacent the of th separating blocks.

3. The electromechanical device of claim 1 wherein the force providing band is constructed of a suitable non-stretchable material which is positioned over the separating blocks.

4. The electromechanical device of claim 1 wherein the group of coil connections around which the band is disposed form a phase group of coils within the device.

5. The electromechanical device of claim 1 including blocking means positioned between each group of coil connections around which the band is disposed.

6. The electromechanical device of claim 1 wherein the conductors are interposed with vent tubes which permit the flow of a cooling medium through the conductors.

7. The electromechanical device of claim 1 wherein the separating blocks contain recessed areas between the portions of the blocks which are adjacent to the same coil connection.

8. The electromechanical device of claim 1 including end blocks located adjacent to the tangentially outermost coil connections in each banded group, with said band extending around said end blocks.

9. The electromechanical device of claim 10 wherein the end blocks at the exciter end of the device include a notch in which the last conductor of the group is positioned.

10. The electromechanical device of claim 1 wherein the separating blocks are wedge-shaped.

* * * * *